(12) United States Patent
Schenk et al.

(10) Patent No.: US 8,768,171 B2
(45) Date of Patent: Jul. 1, 2014

(54) LIGHT-BASED COMMUNICATION FOR CONFIGURATION OF LIGHT-SENSING PERIPHERALS

(75) Inventors: Tim Corneel Wilhelmus Schenk, Eindhoven (NL); Lorenzo Feri, Eindhoven (NL); Bartel Marinus Van De Sluis, Eindhoven (NL); Cornelis Reinder Ronda, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 271 days.

(21) Appl. No.: 12/863,209

(22) PCT Filed: Jan. 16, 2009

(86) PCT No.: PCT/IB2009/050155
§ 371 (c)(1),
(2), (4) Date: Jul. 16, 2010

(87) PCT Pub. No.: WO2009/093158
PCT Pub. Date: Jul. 30, 2009

(65) Prior Publication Data
US 2010/0329691 A1 Dec. 30, 2010

(30) Foreign Application Priority Data
Jan. 24, 2008 (EP) .................................. 08150583

(51) Int. Cl.
*H04B 10/00* (2013.01)
(52) U.S. Cl.
USPC ............. 398/130; 398/25; 398/106; 398/107; 398/127; 398/128
(58) Field of Classification Search
USPC ............................ 398/25, 106–114, 118–131
See application file for complete search history.

(56) References Cited

U.S. PATENT DOCUMENTS

| | | | |
|---|---|---|---|
| 2004/0071294 A1 | 4/2004 | Halgas, Jr. et al. | |
| 2005/0141724 A1 | 6/2005 | Hesdahl | |
| 2006/0049935 A1 * | 3/2006 | Giannopoulos et al. | 340/533 |
| 2006/0153571 A1 | 7/2006 | Nishimura et al. | |

FOREIGN PATENT DOCUMENTS

| | | | |
|---|---|---|---|
| WO | 0195674 A1 | 12/2001 | |
| WO | 2004057927 A1 | 7/2004 | |
| WO | 2005032209 A2 | 4/2005 | |
| WO | 2005058442 A1 | 6/2005 | |
| WO | 2006111927 A1 | 10/2006 | |
| WO | 2006111930 A2 | 10/2006 | |
| WO | WO 2006/111930 | * 10/2006 | |

* cited by examiner

Primary Examiner — Li Liu

(57) ABSTRACT

The present invention relates to light-based communication, and more particularly it relates to methods for configuration of at least one remote light-sensing device, to a central light-emitting unit and to a light-sensing device. According to the invention, spatial configuration of remote light-sensing devices (e.g. peripherals such as loudspeakers or light devices), will be achieved by transmission of embedded identifiers or configuration information in light emitted in a plurality of directions from a central light-emitting unit. With a different identifier or different configuration information for each direction of transmission, the directions can be distinguished from each other. The invention enables a user to place remote light-sensing devices in a desired spatial position and the central light-emitting unit will be able to determine location and spatial function, i.e. for example whether the peripheral is an audio device and/or a lighting device. As a result, the peripherals will be correctly configured without any user interaction required.

9 Claims, 3 Drawing Sheets

LIGHT-BASED COMMUNICATION FOR CONFIGURATION OF LIGHT-SENSING PERIPHERALS

FIELD OF THE INVENTION

The present invention relates to light-based communication, and more particularly it relates to methods for configuration of at least one remote light-sensing device, to a central light-emitting unit and to a light-sensing device.

BACKGROUND OF THE INVENTION

There is an increasing interest in the creation of spatial atmosphere based on home entertainment and multimedia content. In order to create such an atmosphere, spatial distribution of peripheral equipment, including for example loudspeakers, lighting devices and possibly devices for vibration, air and scent effects, is required. There is often a multitude of peripherals involved in the atmosphere creation and ideally one would want to connect all these devices wirelessly and automatically, and make them function correctly without any active user configuration.

Traditionally, the link between a multimedia device and its peripherals is a wired connection. The setup of such a connection is often time-consuming and because of the multitude of components involved, it can be a complex process to make them all work properly. In wire-connected systems it is essential to connect the peripherals to the appropriate output of the atmosphere creation device, for example "left/front", and then place them correctly in their corresponding positions. Should a change of position later be desired, a change of wire connection to a different output has to be performed. Moreover, the peripherals may be shared by more than one atmosphere creation device, for example a TV and a gaming console, and while the peripheral might be configured in a particular position ("left/front") with respect to the TV, it might be configured in another position ("right/back") with respect to the gaming console. This results in a non-intuitive configuration process lacking simplicity.

In the area of illumination control, a method for wireless illumination control based on modulation of emitted light with unique identifiers is described in WO2006111930. In this disclosure, a single light source may be used to function both as a lighting source and a modulated light source. The modulated light source emits uniquely modulated light and a sensing device is adapted to sense the modulated light. Lighting units of which the sensing device senses modulated light are identified by the modulation, i.e. identifier or code, encoded in their modulated light. The sensing device measures the intensity of the modulated light from the identifying lighting unit. The lighting sources are controlled dependent on control data which comprises measuring values of measured light intensities.

SUMMARY OF THE INVENTION

It is an object of the present invention to provide a light-based communication method for spatial configuration of remote light-sensing devices, where spatial configuration data may indicate spatial arrangement and organisation and possibly functional implementation of the remote light-sensing devices in relation to each other and to a central light-emitting unit.

This object is achieved by spatial configuration of at least one remote light-sensing device, wherein the configuration is enabled by embedding identifiers or configuration information in light emitted in a plurality of directions from a central light-emitting unit. With a different identifier or different configuration information for each direction of transmission, the directions can be distinguished from each other. The invention enables a user to place remote light-sensing devices, also known as peripherals, in a desired spatial position and the central light-emitting unit will be able to determine location and spatial function, i.e. for example whether the peripheral is an audio device, such as a loudspeaker and/or a lighting device, such as a Philips LivingColor lamp. As a result, the peripherals will be correctly configured without any user interaction required. The appended dependent claims define preferred embodiments of the invention.

Thus, in accordance with a first aspect of the present invention, a central light-emitting unit is provided for spatially configuring at least one remote light-sensing device comprising:

means for transmitting light in a plurality of directions, each direction being distinguishable by configuration data embedded in the transmitted light, thereby configuring said remote light-sensing device receiving the transmitted light containing embedded configuration data.

In accordance with a second aspect of the present invention, a central light-emitting unit is provided for spatially configuring at least one remote light-sensing device comprising:

means for transmitting light in a plurality of directions, each direction being distinguishable by an identifier embedded in the transmitted light; and means for receiving a confirmation of receipt of at least one identifier by the remote light-sensing device, wherein said remote device is localized.

In accordance with a third aspect of the present invention, a light-sensing device is provided for receiving and adapting to spatial configuration information through communication with a central light-emitting unit, comprising:

means for receiving light containing an embedded identifier;

means for deriving information carried by the received identifier.

In accordance with a fourth aspect of the present invention, a method is provided for spatially configuring at least one remote light-sensing device comprising the steps of:

transmitting light in a plurality of directions, each direction being distinguishable by configuration data embedded in the transmitted light, thereby configuring said remote light-sensing device receiving the transmitted light containing embedded configuration data.

In accordance with a fifth aspect of the present invention, a method is provided for spatially configuring at least one remote light-sensing device comprising the steps of:

transmitting light in a plurality of directions, each direction being distinguishable by an identifier embedded in the transmitted light; and receiving a confirmation of receipt of identifier by the remote light-sensing device, wherein said remote device is localized.

In accordance with a sixth aspect of the present invention, a method is provided for adapting to spatial configuration information from a light-emitting unit, comprising the steps of:

receiving light containing an embedded identifier;

deriving information carried by the received identifier.

Thus, according to the invention the central light-emitting unit emits light with embedded data in the form of identifiers or codes, i.e. the emitted light is modulated with a particular identifier, where different identifiers, are transmitted in different directions. Preferably this information is embedded invisibly in the light, or, by way of example, the light waves could be of infrared type and as such the light itself will be outside of the visual spectrum. The remote light-sensing device is equipped with means for receiving the transmitted light and processing means in order to process the identifiers embedded therein.

Where identifiers or codes are transmitted via the light of the central light-emitting unit and subsequently received by the light-sensing device, said light-sensing device will report back to the central light-emitting unit which identifier or code has been received using the same light connection or a second connection, preferably wireless but possibly wired. If a number of codes are received, the light-sensing device may provide a confirmation report for the strongest code received, all codes received, or a set of the strongest codes received, possibly also with corresponding estimated rank. The central light-emitting unit then uses this information to derive the location, and potentially spatial function (e.g. audio left/front in case of a speaker) of the remote device, relative to the central light-emitting unit. Said light-emitting unit may be arranged so that no further configuration communication is required in order for the remote light-sensing device to function correctly, but the central light-emitting unit may also be arranged so that spatial configuration data is transmitted, by means of the light path or the second connection, from the central light-emitting unit back to the light-sensing device. Where the central light-emitting unit is arranged so that no further configuration communication is required, the transmission of identifiers in a particular direction already implies a particular configuration of the remote light-sensing device. That is, the central device will assume that a peripheral located in a particular direction will have a particular predetermined configuration. Both arrangements have the advantage that the light-sensing device is automatically configured without any user interaction.

As an alternative to the transmission of identifiers or codes, as described above, configuration data may be transmitted directly via the light connection. In this case a confirmation report on received data from the remote light-sensing device to the central light-emitting unit would not be necessary as said light-sensing device will configure accordingly straight away and, as before, without any user interaction.

An advantage of using light in accordance with the present invention is that it enables localization of a remote device, i.e. communication by means of light is inherently directive in contrast to for example a radio connection.

In accordance with an embodiment of the present invention, the central light-emitting unit is a display screen, such as a Philips AmbiLight TV, and the light-sensing devices may have different functions, e.g. they may function as audio or light transmitters. The identifiers are embedded in the light emitted by the AmbiLight and/or backlight of the screen, where said lightsources forming the backlight and/or AmbiLight can be switched at a higher frequency than what is visible to the human eye. In a preferred embodiment of the present invention the backlight and/or the AmbiLight consist of a large number of light sources which are driven separately, and as such enables a fine grain localization of the light-sensing devices. The identifiers are transmitted in different directions and an audio peripheral positioned to the left of the screen will receive for example "identifier 1" and a light peripheral positioned to the right of the screen will receive for example "identifier 3". After communication with the central light-emitting unit and possibly subsequent receipt of configuration data, which may include data containing function information, configuration of the remote devices will take place. For instance, the audio peripheral may receive configuration data setting it as a "left/front" speaker and at the same time enabling it to select a particular audio stream from different, wirelessly broadcasted audio streams, while the light peripheral on the right-hand side receives configuration data instructing it to emit the same colours as the right side of the AmbiLight TV. Should the confirmation receipt include data relating to the function of the peripheral device, it may be possible for the central device to send content data, such as e.g. an audio stream, directly to the peripheral without firstly having to send configuration data.

In accordance with an embodiment of the present invention, the central light-emitting unit emits light with embedded configuration data, instead of identifiers or codes, where different configuration data is continuously transmitted in different directions. This continuous transmission of configuration data may be triggered by, for example, user input, for instance by means of the user handling the central device or controlling the device by means of a remote control. The remote light-sensing device is equipped with means for receiving the transmitted light and processing means in order to process the embedded configuration data so that said remote light-sensing device may use the received configuration data, or received configuration data with the highest strength, to automatically configure itself. This embodiment of the present invention has the advantage that no further communication is necessary to acknowledge the received information nor is the conveying of further configuration data. Optionally the remote light-sensing device may send a configuration report back to the central unit after application of the spatial configuration.

In accordance with an embodiment of the present invention, the central light-emitting unit may comprise embedded identifiers in light, as well as means for receiving embedded identifiers in light, alternatively one of the two. The peripherals may also be arranged in the same way, i.e. equipped with a light source for transmitting identifiers as well as means for receiving identifiers embedded in light, alternatively one of the two. As an effect, each device may function as a peripheral device on one hand and/or a central device on the other. Hence, each particular device may determine its relative location with respect to another device and as such create a full positional map of all devices connected together via a wireless or wired network.

In accordance with an embodiment of the present invention, different data for different effects, such as light, music or other configuration data, is transmitted in different directions by the central light-emitting unit. A possible application could be a user wearing headphones containing the light-sensing device, in front of a 3D display screen. When the user moves relatively to the screen, different audio data will be received, thus creating a 3D sound experience next to the 3D visual experience of the screen.

In accordance with an embodiment of the present invention, when deviations from the original configuration of the light-sensing devices and the central light-emitting unit has taken place, the change can be detected by a difference in assigned identifiers or identifier ratio. Subsequent communication by means of embedded identifiers in light will assign new identifiers or identifier ratios to the light-sensing devices involved, whereby a reconfiguration will be automatically implemented.

These and other aspects of the invention will be apparent from and elucidated with reference to the embodiments described hereinafter. It should be understood that the detailed description and specific examples, while indicating preferred embodiment of the invention, are intended for purposes of illustration only and are not intended to limit the scope of the invention.

BRIEF DESCRIPTION OF THE DRAWINGS

Detailed embodiments of the present invention will be described with reference to attached drawings, where.

DETAILED DESCRIPTION OF THE PREFERRED EMBODIMENTS

Figure 1:
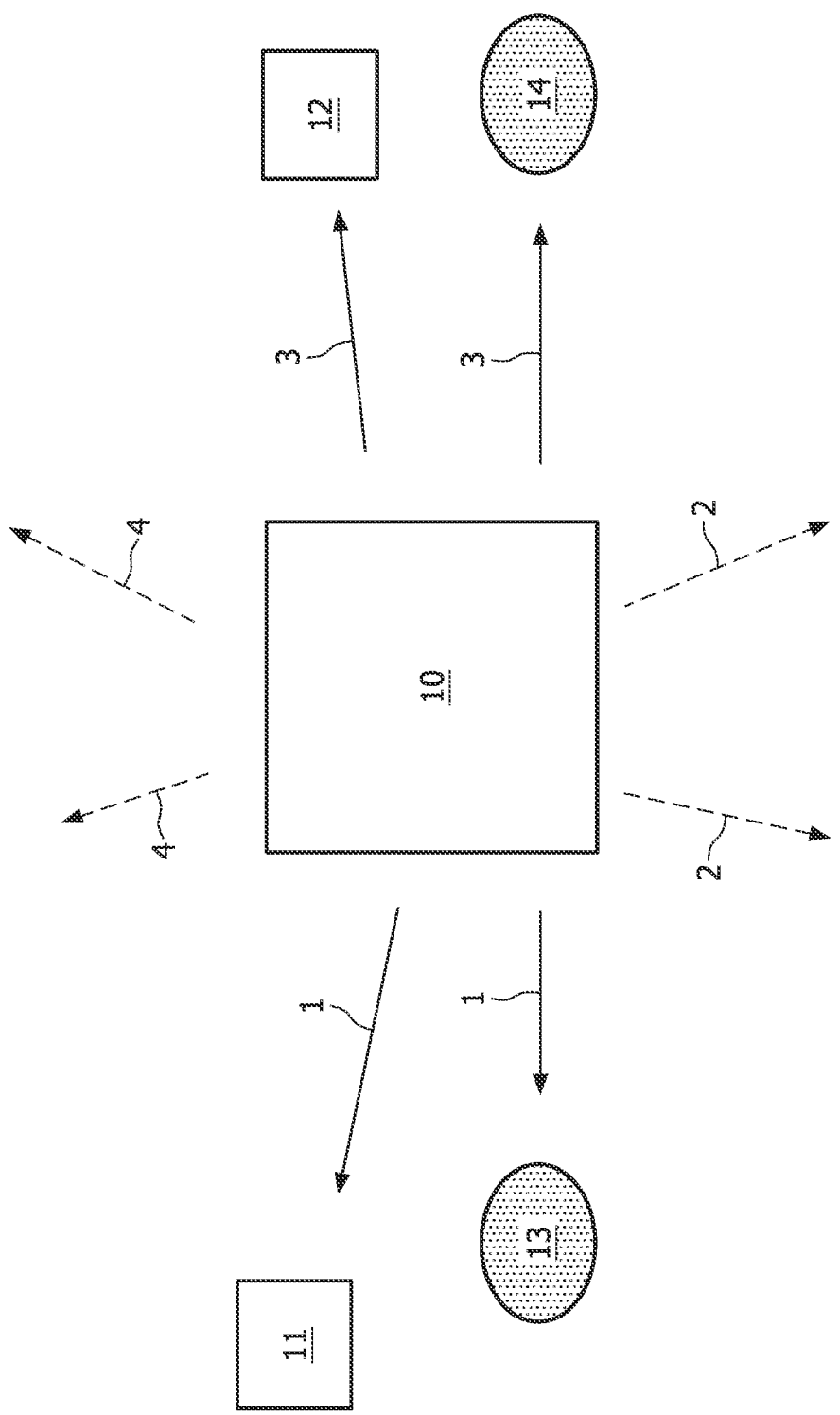
FIG. 1 shows a central light-emitting unit and remote light-sensing devices in accordance with preferred embodiments of the present invention.

An embodiment of the central light-emitting unit 10 identifying the spatial configuration of a plurality of remote light-sensing devices 11, 12, 13, 14 is shown in FIG. 1. The central light-emitting unit 10 is a display screen, which has embedded identifiers 1, 2, 3, 4 in the light elements of the AmbiLight or backlight of the screen. Typically these light elements are LEDs or gas discharge lamps. Two of the remote light-sensing devices are loudspeakers 11, 12 and two are lamps 13, 14 such as Philips LivingColor lamps. The light-sensing devices are each placed in a desired position in the same room as the central light-emitting device. When light is emitted, the different identifiers 1, 2, 3 and 4 embedded therein are transmitted in different directions. The identifiers are received by the speakers 11, 12 and lamps 13, 14 and after communication with the central light-emitting device 10 correct configuration can be implemented.

Figure 2:
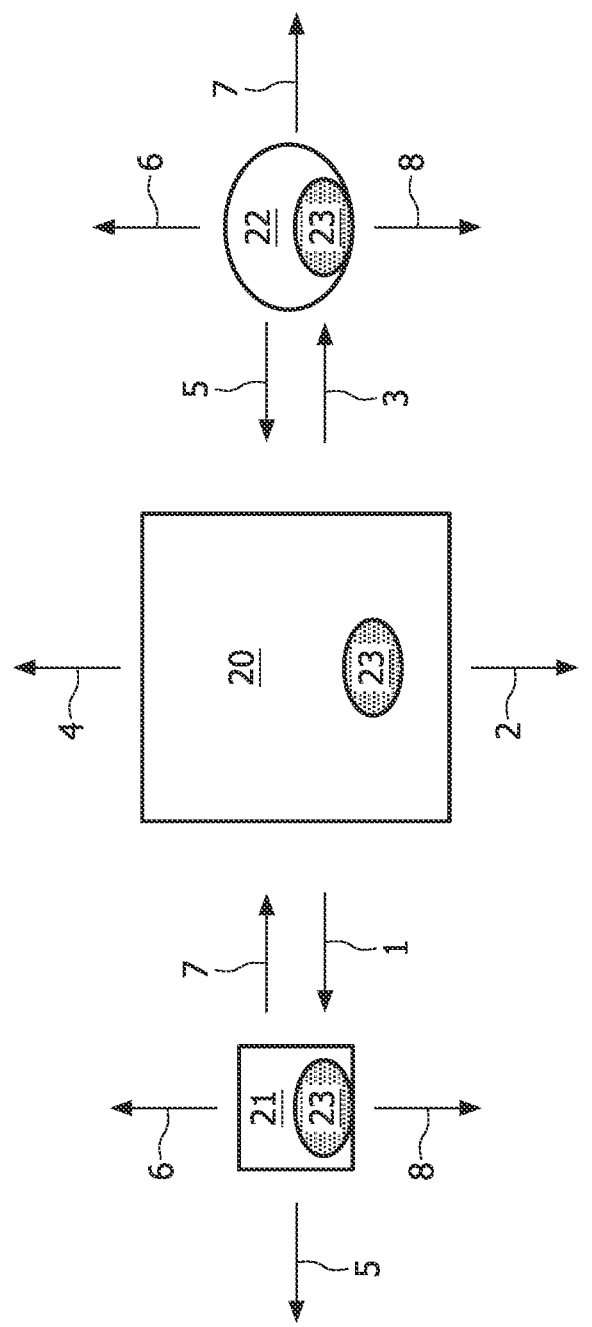
FIG. 2 shows a central light-emitting unit and remote light-sensing devices in accordance with a further embodiment of the present invention.

FIG. 2 illustrates a second embodiment of the central light-emitting unit 20 and the peripherals 21, 22 according to the present invention. The central light-emitting unit comprises embedded identifiers in light 1, 2, 3, 4 as well as means for receiving embedded identifiers in light 23. The peripherals are also capable of transmitting identifiers 5, 6, 7, 8 and they comprise means for receiving identifiers or spatial configuration information embedded in light 23. Consequently, each device may simultaneously function as both a light-sensing device and a light-emitting device. Hence, each particular device may determine its relative location with respect to another device and as such create a full positional map of all devices which are connected together via a wired or wireless network.

Figure 3:
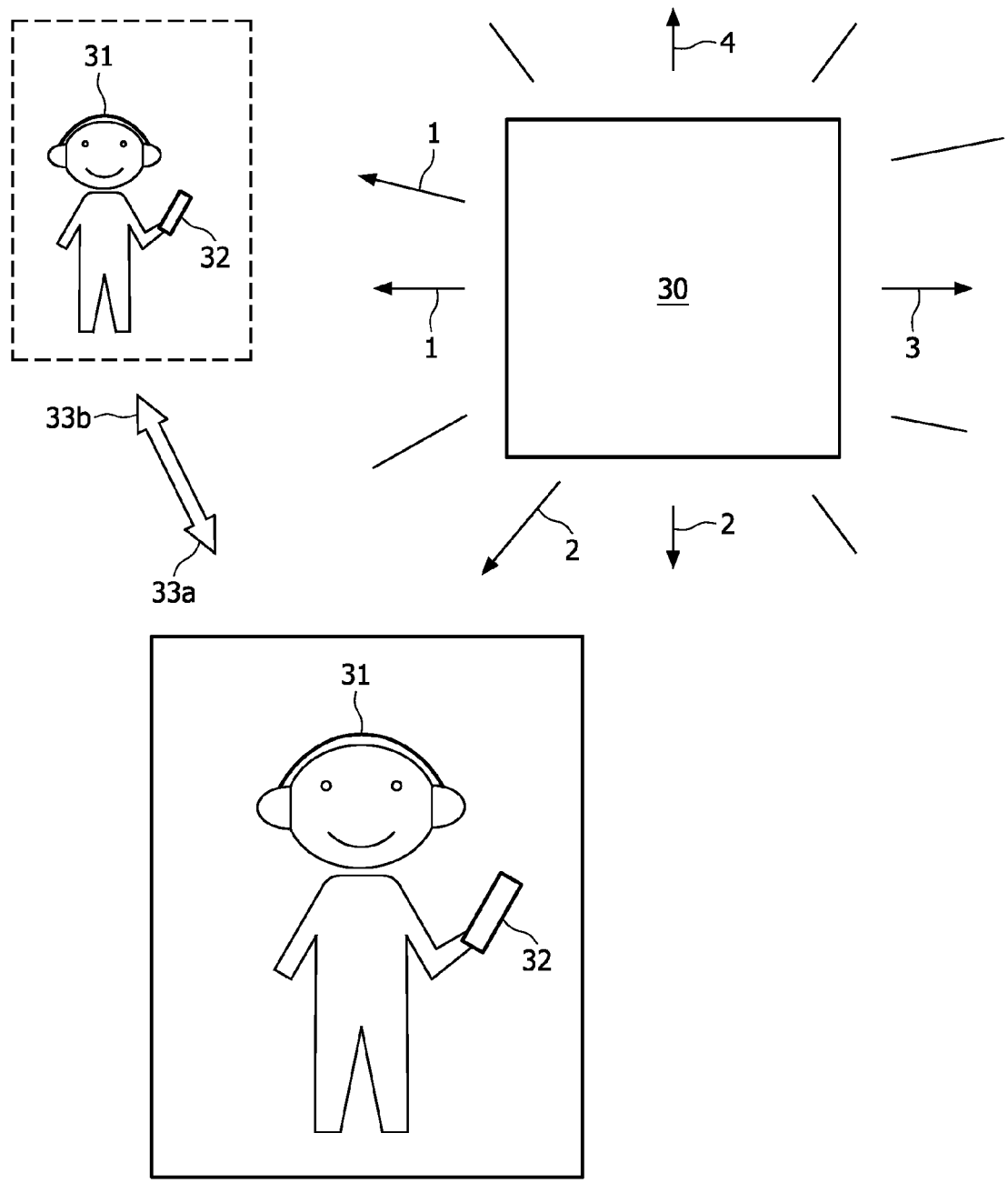
FIG. 3 shows a central light-emitting unit and remote light-sensing devices in accordance with still a further embodiment of the present invention.

FIG. 3 illustrates a third embodiment of the present invention. FIG. 3 shows a room where the central light-emitting unit is a 3D display screen 30, one light-sensing device contained in a pair of headphones 31 and another light-sensing device contained in a remote control 32. When the headphones are moved relatively to the screen 33a, 33b, different identifiers 1, 2, 3 or 4 will be received along with different audio data. As a result, a 3D sound experience will be created next to the 3D visual experience of the screen. The remote control can in this embodiment also act as a triggering device handled by a user for controlling transmission of identifiers/configuration data of the central light-emitting device.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of spatially configuring at least one remote light-sensing device relative to a central light emitting unit comprising the steps of:
   transmitting light from the central light emitting unit in a plurality of directions, each direction being distinguishable by an identifier, having predetermined configuration data based on a particular direction, embedded in the transmitted light,
   receiving the light at the at least one remote light-sensing device, and
   receiving at the central light emitting unit a confirmation of receipt of at least one identifier by the remote light-sensing device, and deriving the direction/location and function of said remote device from said at least one identifier.

2. Method according to claim 1, further comprising the step of transmitting configuration data to the remote light-sensing device using the derived direction and configuring said remote light-sensing device based on the embedded configuration data.

3. Method according to claim 1, further comprising the step of transmitting, by the central light emitting unit, configuration data based on said function.

4. Method according to claim 1, further comprising the step of transmitting data for a required effect which the light-sensing device is to comply with, to said remote light-sensing device.

5. A central light-emitting unit (10) for spatially configuring at least one remote light-sensing device comprising:
   a transmitter to transmit light in a plurality of directions, each
   direction being distinguishable by an identifier, having predetermined configuration data based on a particular direction, embedded in the transmitted light;
   a receiver to receive a confirmation of receipt of at least one identifier by the remote light-sensing device, and deriving the direction/location and function of said remote device from said at least one identifier.

6. A central light emitting unit according to claim 5, comprising means for transmitting configuration data to said remote light-sensing device from which the confirmation was received.

7. A central light emitting unit according to claim 5, where data for a required effect, is transmitted.

8. A central light emitting unit according to claim 5, where the transmission of embedded identifiers in light is performed by one of the following: a display screen, backlight of a display screen or light sources beside a display screen.

9. A central light emitting unit according to claim 5, where the transmitted light, containing embedded identifiers is infrared light.

* * * * *